April 13, 1965 J. B. LINDECKER 3,178,054
THIN FLAT ARTICLE DISPENSING CARTON
Filed Aug. 30, 1963 2 Sheets-Sheet 1
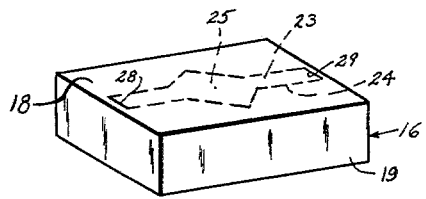
Fig-1-
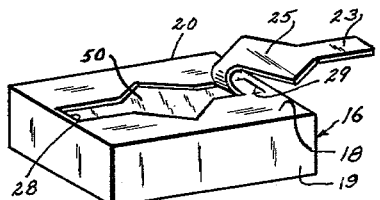
Fig-2-
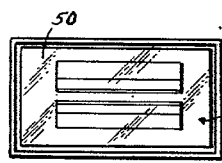
Fig-7-
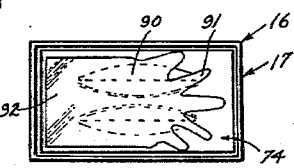
Fig-8-
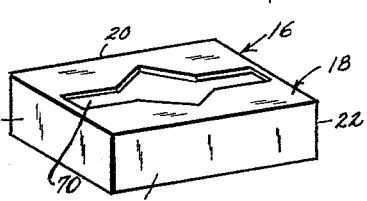
Fig-3-
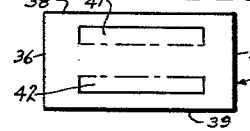
Fig-5-
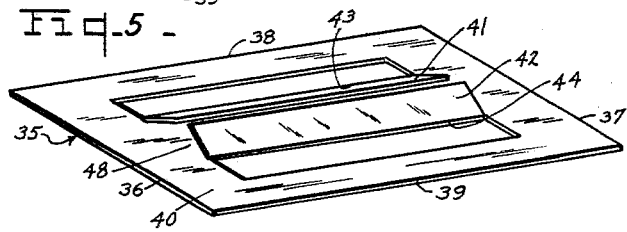
Fig-6-
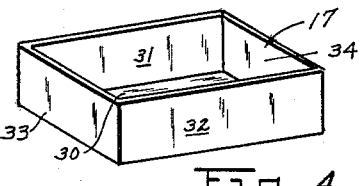
Fig-4-
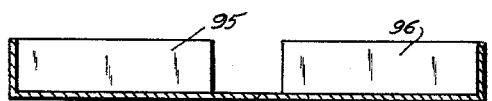
Fig-10-
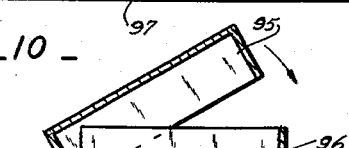
Fig-11-
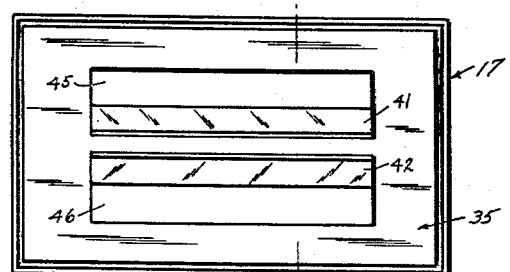
Fig-9-
INVENTOR.
JOSEPH B. LINDECKER.

April 13, 1965   J. B. LINDECKER   3,178,054
THIN FLAT ARTICLE DISPENSING CARTON
Filed Aug. 30, 1963   2 Sheets-Sheet 2
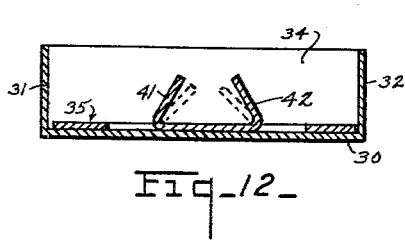
Fig-12-
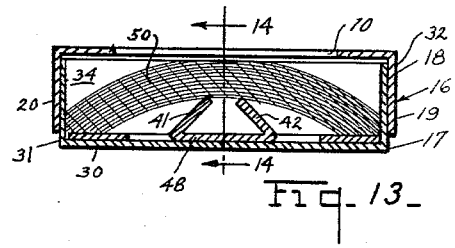
Fig-13-
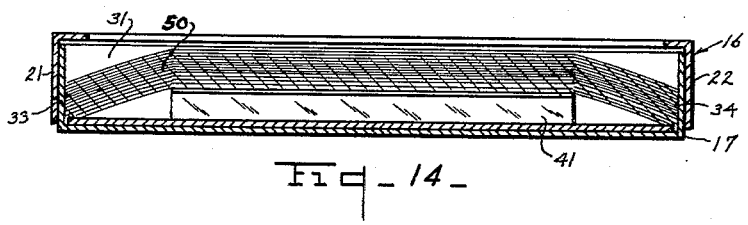
Fig-14-
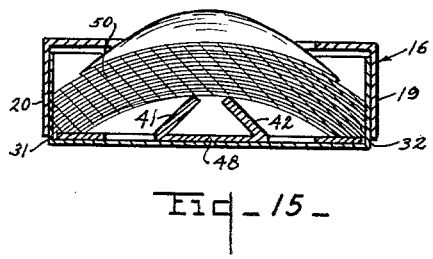
Fig-15-
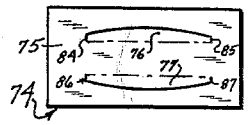
Fig-16-
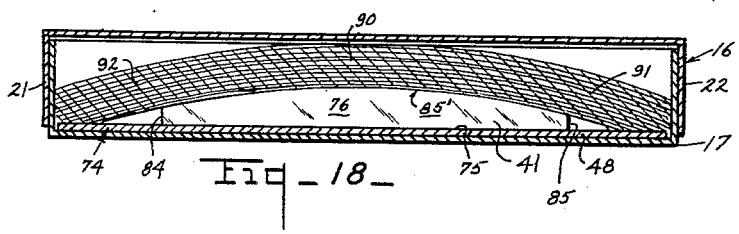
Fig-18-
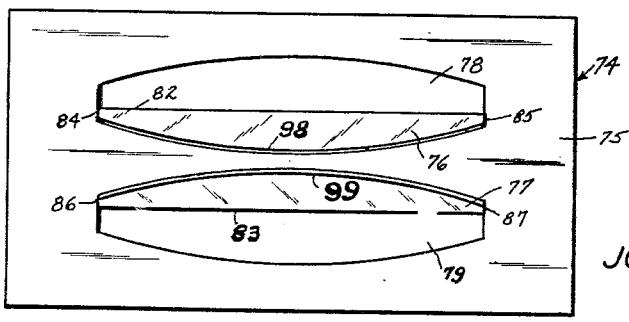
Fig-17-
INVENTOR.
JOSEPH B. LINDECKER.

United States Patent Office 3,178,054
Patented Apr. 13, 1965

3,178,054
THIN FLAT ARTICLE DISPENSING CARTON
Joseph B. Lindecker, Skokie, Ill.
(1193 Valetta Drive, Temperance, Mich.)
Filed Aug. 30, 1963, Ser. No. 305,716
5 Claims. (Cl. 221—58)

This invention relates to improvements in dispensing cartons of a type suitable for dispensing thin plastic bags, plastic gloves and the like, and whereby the articles within the dispenser will be protected from being soiled and are held in a compact manner until required for use and presented for easy removal individually at all times.

The object of the invention is in a dispensing carton of extremely simple and inexpensive construction that may be manufactured of any suitable sheet material and especially of cardboard or paper board that will lend itself to printing of decoration on the exterior surfaces, and which will be primarily useful in a home, kitchen, or other place where such articles are required; the carton provided with means which, as the articles are removed, continues to press those remaining toward removing position.

To this end the dispensing carton comprises a box of suitable material, such as cardboard, the top embodying a tear-out strip providing an opening or slot through its top face through which the user's fingers may be passed to engage the exposed face of the outer article within the box, the articles being assembled in a stack or pack. The box top is generally separate from the bottom thereof; however, it can be integral with the bottom by having a common hinged portion, whereby the top and bottom are made from a single piece of cardboard. Further the top portion can be formed with an opening, without the tear-out strip, if so desired. Beneath the pack and opposite to the slot there is provided a pack-engaging element, preferably also formed of cardboard, perforated and formed to provide an integral, resilient type element on which the pack rests and which continues to press the articles in the pack into position for removal one by one as they are so removed.

This invention also relates to a novel method of preparing the carton, positioning the lower box portion, dropping an insert into said lower box portion, depositing a stack of flat articles on top of said insert, assembling a cover portion of the box thereto and sealing the top and bottom portions of the box together.

The invention consists in certain novel combinations and arrangements of parts in the construction and for the operation of the dispenser, as will hereinafter be more fully set forth and claimed.

For a complete understanding of this invention, reference may be had to the accompanying drawing in which:

FIGURE 1 is a perspective view of a filled, unbroken carton, embodying the invention in the form of a box having its protective cover applied;

FIGURE 2 is a similar view of the same carton with the tear-out strip partly removed and the contents of the carton exposed;

FIGURE 3 is a perspective view of the protective cover with the tear-out strip completely removed;

FIGURE 4 is a perspective view of the bottom portion of the box;

FIGURE 5 is a top plan view of a box insert, cut but not formed;

FIGURE 6 is a top perspective view of the box insert in the form of a flat plate with upwardly raised supports integrally formed therewith;

FIGURE 7 is a reduced top plan view showing the plastic, transparent bags arranged in the bottom portion of the box;

FIGURE 8 is a top plan view, similar to FIG. 7, showing plastic, transparent gloves arranged in the bottom portion of the box, with an insert as shown in FIG. 17;

FIGURE 9 is a top plan view of the box insert arranged in the bottom portion of a box;

FIGURE 10 is a sectional view of an open box having the top portion integrally formed with the bottom portion thereof;

FIGURE 11 is a sectional view of the box shown in FIG. 10, but having the top cover partially applied to the bottom portion of the box;

FIGURE 12 is a sectional view taken on line 12—12 of FIGURE 9;

FIGURE 13 is a sectional view similar to FIGURE 12 but showing the box cover applied to the lower portion and the box filled with bags;

FIGURE 14 is a sectional view taken on line 14—14 of FIGURE 13;

FIGURE 15 is a view similar to FIGURE 13, but having one of the bags partially removed from the carton or box;

FIGURE 16 is a top plan view of a box insert similar to that shown in FIG. 5, and illustrating a modified construction;

FIGURE 17 is a top plan view similar to FIG. 16, but with the supports in raised position; and FIGURE 18 is a longitudinal, sectional view of a box filled with gloves and arranged upon the raised supports of the modified construction.

Referring first to FIGURES 1 through 9, there is shown a box formed up from sheet material, such as cardboard. The box may have a separate cover 16 and a bottom portion 17, the cover being formed of a top 18, side walls 19 and 20 and end walls 21 and 22. The top 18 is provided with a tear-out strip 23, which is defined by parallel lines of weakness, produced in any suitable manner. As shown, the lines of weakness are formed by spaced perforations 24. The tear-out strip 23 extends substantially the longitudinal length of the cover and for a greater part of its length is made as narrow as the requisites of strength and convenience of handling permit. Intermediate its ends, strip 23 has a transverse enlargement 25 to provide adequate working room for the fingers when withdrawing the articles. The transverse boundaries 28 and 29 of the strip 23, at the ends, are completely severed from the top 18 to facilitate the tearing out of the strip 23, without danger of destroying the strip or damaging the cover. It will be observed that the tear-out strip 23 runs lengthwise of the carton, and is disposed on the median line of the top 18 forming a discharge opening 70. The bottom portion 17 of the box is formed of a base 30, side walls 31 and 32 and end walls 33 and 34, the base 30 and walls 31–34 being of rectangular configuration.

Disposed within the bottom portion 17 is an insert member 35 comprising a rectangular sheet of resilient type cardboard, or the like, of a width and length substantially equal to the distances between the side walls 31 and 32, and end walls 33 and 34 of bottom 17. The insert 35 is formed from a one-piece blank 40 shown in FIG. 5. The insert is bounded by end wall edges 36 and 37 and side wall edges 38 and 39, and formed with two integral, longitudinal article supporting members 41 and 42 extending substantially three-fourths the longitudinal distance between end edges 36 and 37 thereof, the supporting members being of equal width and length and of rectangular configuration and foldably connected to the base, or blank 40, at the fold lines 43 and 44.

It will be noted that the supporting members 41 and 42 are cut along the outer longitudinal edges and end edges from the blank 40, leaving rectangular shaped openings 45 and 46 therein and located between the fold lines 43 and 44 and side edges 38 and 39 and centrally between the end edges 36 and 37 of the blank 40. The supporting members 41 and 42 are folded upwardly and toward each other, and combined with the base portion 48 between the fold lines 43 and 44, substantially form a longitudinal article support with a stationary base 48 and movable side walls 41 and 42, triangular in cross-section with an open apex along the free edges of the support members 41 and 42, arranged directly over the median line of the blank 40. It is seen that the important feature of the present invention resides in the manner in which the insert 35 is arranged in the box without any additional fastening means. The box supports the insert 35 while the supporting members are held in one location relative to the side and end walls of the box, and over the median line thereof. The supporting members being hingedly or foldably connected with the base act as a single follower and have their longitudinal free edges bearing resiliently outwardly against the bags in the box.

The box modification shown in FIGURE 10 shows a top portion 95 integrally connected to the lower portion 96 by a web or hinged portion 97. Either of the inserts described may be used with this box.

The operation of the device is substantially as follows: With the cover 16 removed, a stack 50 of thin, plastic bags is laid over the supporting members 41 and 42 of the insert 35 arranged within the bottom portion 17 of the box, and the cover is pressed downwardly until the depending walls thereof cover the upwardly extending walls of the bottom portion 17; the cover and lower portion of the box are then secured together by suitable means such as adhesive tape or the like. When the tear-out strip is removed as heretofore described, the top plastic bag may readily be removed by grasping the exposed portion thereof within the enlarged portion of the slit 70 and drawing it outwardly therethrough, as indicated in FIG. 15.

The outwardly resilient force of supporting members 41 and 42 of insert 35 upon the stack 50 of bags urges said stack firmly against the inner surface of the cover 16 of the box, and provides that the top bag will always be properly held adjacent opening 70 for convenient removal. As successive bags are removed for use, the supporting members 41 and 42 are gradually moved upwardly by the resilience thereof affected at the fold lines 43 and 44. This provides that the central portion of the bags will be compressed to a greater degree than the edge portion in frictional contact with the side walls of the bottom portion of the box. Thus the stack is held firmly so that the initial withdrawal of a bag may be made easily and without damage to the bag. The relatively light gripping of the central portion of the bag stack presses the stack slightly downwardly, compressing the supporting members 41 and 42 toward each other momentarily. Only the central portion of the stack of bags is under actual compression. The longitudinal ends of the bags sag to the bottom of the box since the supporting members do not extend the entire length of the box, whereby the bags are arched both transversely and longitudinally.

In FIGURES 8, 16, 17 and 18 a modification is shown particularly suitable where the articles to be removed are short gloves, which ladies desire to wear to protect their hands while working and washing dishes and the like. In this form of the carton, the box is formed of two parts as described above. The insert 74 is modified and, as shown in FIGURES 16–18, consists of a base 75 with supporting members 76 and 77 cut and folded as described above re: members 41 and 42, leaving openings 78 and 79 therein. Each supporting member 76 and 77 is connected to the base 75 along a fold line 82 or 83, and has end edges 84, 85, or 86, 87, formed at ninety degrees from the fold lines 82 and 83. The longitudinal free edges 98 and 99 are arched outwardly relative to the fold lines 82 and 83, providing arcuate glove supporting members.

The gloves are held firmly between the arcuate supporting members located on the medial line of the box, and the members are so arranged and so shaped longitudinally as to allow the finger portions 91 of the gloves 90 to be located between the ends of the arcuate shaped supporting members and one end wall of the lower portion of the box. Normally the finger portions of the gloves extend transversely a greater distance than the wrist portion 92 thereof. The box is normally of a width to accommodate gloves of a certain wrist size. The arcuate support members provide the arcuate arrangement of the gloves whereby the finger portions 91 thereof are suitably arranged within the box of wrist width. Where the supporting members are shaped as in FIG. 9, the fingers of the gloves do not have sufficient room for stacking. However, the arcuate supporting members make it possible to stack gloves in a smaller box and permit removal thereof one by one, easily and conveniently.

While I have shown a specific embodiment of my invention, it is apparent that minor changes of construction and operation could be made without departing from the spirit of the invention.

I claim:

1. A thin flat article dispensing carton comprising a lower body portion having a rectangular bottom wall, side and end walls integral with the said bottom wall and projecting upwardly from the periphery thereof, an upper top cover portion having a rectangular top wall, side and end walls integral with the said top wall and depending from the periphery thereof, a flat one piece insert of rectangular configuration substantially of the same width and length as that of the width and length of said bottom wall of the lower body portion, said top wall having a longitudinal elongated tear-out strip therein midway between the side walls of the top cover portion to provide a thin flat article withdrawing slot, said insert located within the lower body portion and upon the said bottom wall thereof and having a pair of integral longitudinal article supporting members extending resiliently upwardly and angularly toward each other for supporting a stack of thin flat articles arranged with their upper longitudinal medial portion abutting the underside of the top wall adjacent said withdrawing slot, and the longitudinal article supporting members having upper free longitudinal edge portions to conform to and engage with the lowermost article of the stack of thin flat articles for forcing the longitudinal medial portion of the uppermost thin flat article adjacent said longitudinal withdrawing slot and into the opening for withdrawal from the said withdrawing slot effected by the inherent energy of said supporting members to flex upwardly and away from each other.

2. A dispensing carton according to claim 1 wherein said two supporting members are each rectangular and oblong in shape with opposite sides parallel and therefore equal.

3. A dispensing carton according to claim 1 wherein said two supporting members are each foldably connected with the insert member along a straight fold line and have the opposite ends thereof parallel and have an upper longitudinal curved free edge portion spaced a suitable distance from its straight integral folding, hinge-like, fold line portion with said insert member.

4. A dispensing carton according to claim 1 wherein said two supporting members each have an upper convex longitudinal free article supporting edge portion.

5. The article dispensing carton according to claim 1 wherein said thin flat articles are thin sheet type gloves and the width of said insert is substantially equal to the wrist width of said gloves and narrower than the lateral distance across the fingers of the gloves.

(References on following page)

References Cited by the Examiner

UNITED STATES PATENTS

| | | | |
|---|---|---|---|
| 1,773,652 | 8/30 | Traver | 221—302 X |
| 1,796,262 | 3/31 | Gaisman | 221—58 X |
| 2,287,420 | 6/42 | Edmonston | 221—63 |
| 2,460,306 | 2/49 | Patterson | 221—52 X |
| 2,689,059 | 9/54 | Nudell | 221—63 X |
| 2,849,152 | 8/58 | Tuttle | 221—48 |
| 3,019,944 | 2/62 | Nelson et al. | 221—302 |

FOREIGN PATENTS 1,219,372  12/59  France.

RAPHAEL M. LUPO, *Primary Examiner.*

KENNETH N. LEIMER, *Examiner.*